United States Patent [19]

Hicks

[11] Patent Number: 4,781,536

[45] Date of Patent: Nov. 1, 1988

[54] LOW-FLOW PUMP-OFF CONTROL

[76] Inventor: Russell R. Hicks, 7034 S. Jamestown, Tulsa, Okla. 74136

[21] Appl. No.: 905,505

[22] Filed: Sep. 10, 1986

[51] Int. Cl.$^4$ .......................... F04B 49/02; G01F 1/42
[52] U.S. Cl. ........................................ 417/12; 417/43; 417/53; 73/861.52; 73/861.61; 73/861.62
[58] Field of Search ................ 200/81.9 R; 73/861.52, 73/861.61, 861.62; 417/12, 43, 53

[56] References Cited

U.S. PATENT DOCUMENTS

| | | | |
|---|---|---|---|
| 1,273,597 | 7/1918 | Fisher. | |
| 1,559,156 | 10/1925 | Bullock | 73/861.61 |
| 1,759,239 | 5/1930 | Morrison. | |
| 1,768,563 | 7/1930 | Brown. | |
| 2,614,423 | 10/1952 | Carbone | 73/211 |
| 2,788,411 | 4/1957 | Porwancher | 299/81.5 |
| 2,929,248 | 3/1960 | Sprenkle | 73/198 |
| 3,091,179 | 5/1963 | Eckols | 417/12 |
| 3,209,779 | 10/1965 | McGowan | 137/327 |
| 3,299,817 | 11/1967 | Walters et al. | 200/81.9 R |
| 3,321,970 | 5/1967 | Walker, Sr. et al. | 73/861.62 |
| 3,551,620 | 12/1970 | Hoover | 200/83 |
| 3,559,731 | 2/1971 | Stafford | 417/12 |
| 3,838,598 | 10/1974 | Tompkins | 73/861.52 |
| 3,840,051 | 10/1974 | Akashi | 73/861.52 |
| 3,972,648 | 8/1976 | Sangster | 417/12 |
| 4,118,148 | 10/1978 | Allen | 417/12 |
| 4,372,150 | 2/1983 | Stephens et al. | 73/40.5 |
| 4,413,676 | 11/1983 | Kervin | 166/53 |
| 4,507,053 | 3/1985 | Frizzell | 417/12 |
| 4,527,953 | 7/1985 | Baker | 417/43 |
| 4,552,058 | 11/1985 | Woolridge | 417/12 |
| 4,557,296 | 12/1985 | Byrne | 73/861.61 |

Primary Examiner—William L. Freeh
Attorney, Agent, or Firm—Lane & Aitken

[57] ABSTRACT

A low-flow pump-off control device for deactivating a motor for a pump during conditions when a rate of supply of a source of fluid to be pumped by the pump is insufficient includes: a pipe section having an inlet and an outlet, the inlet being connectable to the source of fluid to be pumped through the pipe section; a plurality of plates disposed substantially perpendicularly in the pipe section, each of the plates defining at least one orifice through which the fluid is caused to pass; a differential pressure switch for sensing a differential pressure between a pressure upstream of a first one of the plates and a pressure downstream of a last one of the plates that is at or below a set point indicative of a predetermined low flow rate of the liquid; a first timer in communication with the switch for accumulating periods of time at which the switch senses the differential pressure; a motor activation and deactivation relay in communication with the timer for deactivating the motor when the accumulated periods of time total a predetermined amount; and a second timer in communication with the first timer which is activated when the accumulated periods of time total the predetermined amount, wherein the motor activation and deactivation relay is in communication with the second timer and activates the motor when the second timer times a second predetermined amount of time.

11 Claims, 5 Drawing Sheets

LOW-FLOW PUMP-OFF CONTROL

BACKGROUND OF THE INVENTION

1. Field of the Invention

The present invention pertains to an apparatus for deactivating a pump, such as a downhole progressing cavity pump, when a fluid level on the inlet side of the pump is insufficient.

2. Discussion of the State of the Art

There are many commercially available suction pumps that may be damaged when the fluid level on the inlet side drops below a certain level. Such pumps are used in a wide variety of applications, and one example is the use of a progressing cavity down-hole oil pump for pumping oil from the ground.

The progressing cavity down-hole oil pump is installed in a well and the drive head, which is mounted at the wellhead, rotates a rotor which in turn displaces fluid from a stator, up through tubing, and to the wellhead at the surface. Oil, water and gas pass from the wellhead through a flowline to a treating and storage facility.

When an underground reservoir fails to provide sufficient oil and water to keep the pump suction covered, a situation commonly known as a "pumped off" condition arises. The progressing cavity pump operating under this condition for very long will become damaged. Further, at least in an oil well application, the liquid is often surging in a pumped-off condition, and a pump shut-down may be triggered prematurely by the retreating stage of a surge cycle. There is a need in the art for a pump-off control system that will stop a suction pump in a low-flow situation and will not be triggered prematurely in a surging situation.

In order to solve the problem of deactivating a pump when a pumped-off condition exists, an object of the present invention is to provide a low-flow pump-off control that causes a pump motor to be shut off when there is an insufficient flow of fluid to an inlet side of the pump.

It is a further object of the invention to provide a low-flow pump-off control that causes the motor to be shut off when the low flow of fluid to the pump inlet threatens to damage the pump.

It is a further object of the invention to provide a low-flow pump-off control that will not shut off a pump motor prematurely during a retreating stage of a surge cycle.

It is a further object of the invention to provide a low-flow pump-off control that will not fail to shut off a pump motor because a low flow situation is continuously interrupted by brief intervals of sufficient flow.

It is a further object of the invention to provide a low-flow pump-off control that generates a differential pressure in a series of stages and provides a passage for gas that is different from a passage for liquid.

It is a still further object of the invention to provide a low-flow pump-off control that is controlled by a differential pressure switch wherein a differential pressure indicative of an adequate flow rate is employed that is sufficiently different from a differential pressure indicative of an inadequate flow rate.

Other objectives of and additional problems solved by the present invention will become apparent from the following detailed description.

SUMMARY OF THE INVENTION

In order to satisfy the needs of the prior art, the present invention provides an improved low-flow pump-off control device for deactivating a motor for a pump during conditions when a rate of supply of a source of fluid to be pumped by the pump is insufficient. The device includes a pipe section having an inlet and an outlet, the inlet being connectable to the source of fluid to be pumped through the pipe section, a plurality of plates disposed substantially perpendicularly in the pipe section, each of the plates defining at least one orifice through which the fluid is caused to pass, and a differential pressure switch for sensing a differential pressure between a pressure upstream of a first one of the plates and a pressure downstream of a last one of the plates that is at or below a set point indicative of a predetermined low flow rate of said liquid. A first timer in communication with said switch is provided for accumulating periods of time at which the switch senses the differential pressure that is at or below the set point, and a motor deactivation means in communication with the timer deactivates the motor when the accumulated periods of time total a predetermined amount. A second timer in communication with said first timer is activated when the accumulated periods of time total the predetermined amount, and a motor activation means in communication with the second timer activates the motor when the second timer times a second predetermined amount of time.

DESCRIPTION OF THE PREFERRED EMBODIMENTS

The flow rate of a liquid through a pipe can be determined as a function of a differential between a pressure measured upstream and a pressure measured downstream of an orifice fixed in the pipe. The downstream pressure is equal to or lower than the upstream pressure, and a pressure drop determines flow rate in accordance with the formula $$Q = c\sqrt{h_w},$$

where Q is the rate of flow in gallons per hour, C is the orifice constant, and $h_w$ is the differential pressure in inches of water.

The present invention utilizes this principle to determine a point at which a suction pump should be shut down due to an insufficient rate of flow of a source of fluid to the pump. A pipe section, provided with a plurality of orifice plates, optionally in combination with a choke valve, is inserted in a flowline through which a fluid displaced by the suction pump flows. The orifice plates and the choke valve generate a pressure drop in a step-wise fashion, and the magnitude of the drop is determined by measuring the pressure in the fluid stream before and after the pipe section. A determination is made as to how low the fluid flow rate can be without damaging the suction pump, or without otherwise being insufficient, and a differential pressure set point is selected that corresponds to the upper limit of the insufficient rate. This is illustrated below in detail in connection with a downhole progressing cavity oil pump, but the invention is equally suitable for suction pumps used in a variety of other applications.

Figure 1:
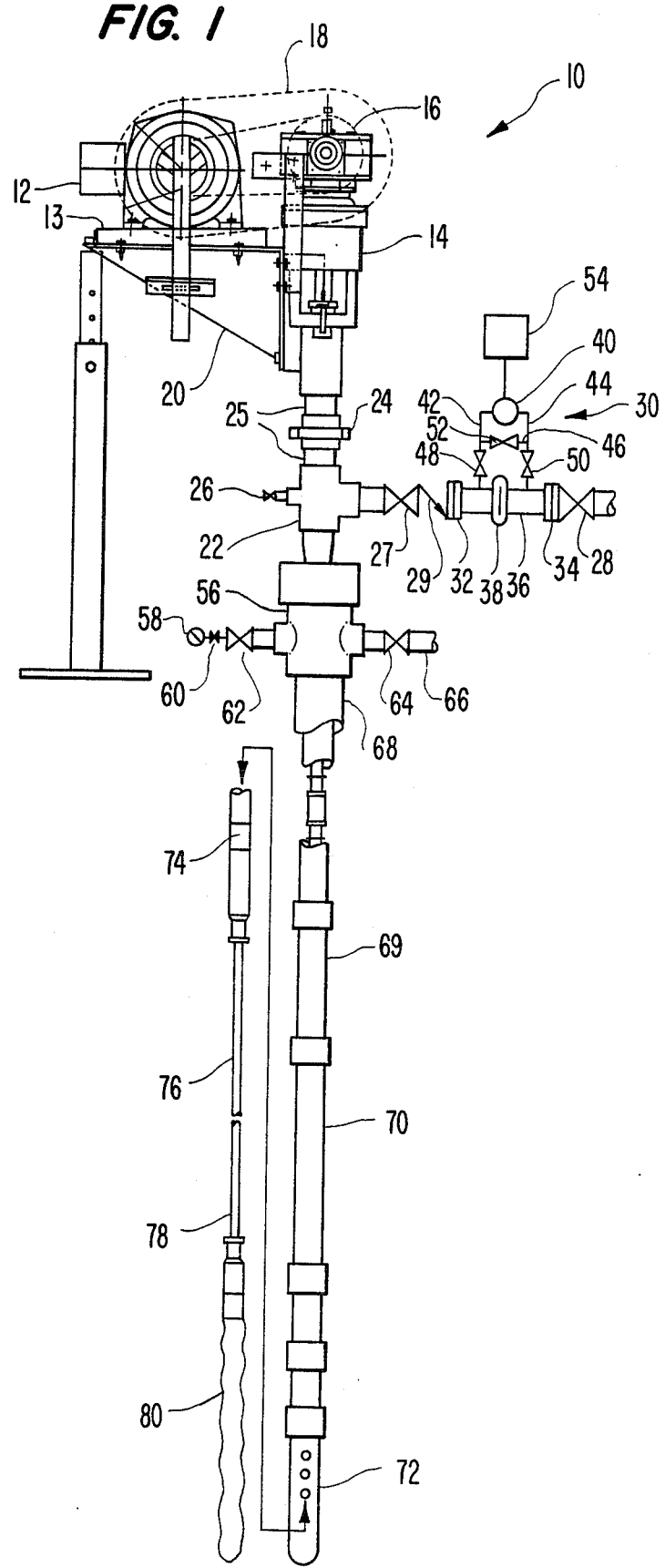
FIG. 1 is a side view of a down-hole progressing cavity pump and associated apparatus, including the present invention.

A downhole progressing cavity pump and associated apparatus to which the present invention is beneficially applied is illustrated in FIG. 1. The pumping apparatus 10 is driven by electric motor 12 which is supported on motor slide base 13. The motion of the electric motor spindle is translated to drive head 14 by means of sheaves and v-belts 16 which are protected by belt-guard 18. Mounting bracket 20 supports the electric motor and attaches to the drive head. Flow-tee 22 is connected to the drive head by means of hammer union 24 and nipple 25.

Flow-tee 22 is provided with sample cock 26 and block valve 27. The block valve is provided for isolating the downstream flowline from the well-head. When it and downstream block valve 28 are closed, the low-flow pump-off control 30, which is the subject of this invention, is conveniently removed for servicing. Check valve 29 is a one-way valve and ensures flow through the associated flowline only in the direction towards control 30.

The pump-off control is provided with connecting flanges 32, 34 on either end of pipe section 36. The pipe section is provided with a plurality of orifice plates, and a means 38 for securing one orifice plate is visible in FIG. 1. A differential pressure switch 40, which comprises a gauge for measuring differential pressure, is in communication with the fluid stream below and above the orifice plates through fluid lines 42, 44. A third fluid line 46 connects fluid lines 42 and 44. Isolating valves 48, 50 and center valve 52 are disposed, respectively, on fluid lines 42, 44 and 46. In use, valves 48 and 50 are opened, and center valve 52 is closed. In order to isolate the differential pressure switch from pipe section 36, isolating valves 48 and 50 are closed. If desired, center valve 52 can then be opened to equalize the pressure on either side of the differential pressure switch to simulate a no-flow condition and test the switch. Circuitry housing 54 contains circuitry in communication with the differential pressure switch, as will be discussed in more detail in connection with FIG. 5.

Tubing head 56 is disposed below flow-tee 22. The tubing head is provided on one side with pressure gauge 58, a valve 60 which enables isolation of the pressure gauge, and a block valve 62. The other side of the tubing head is provided with a block valve 64 which leads into conduit 66. The conduit provides access to the annular space between the tubing and casing, as described below, and is suitable for carrying away any gas that comes up through the annular space.

Below tubing head 56 is casing 68, which surrounds tubing 69. The tubing is connected to stator 70, which is anchored by mud/gas anchor 72. The tubing also surrounds drive head shaft 74. Pony rods 76 and sucker rods 78 extend from the drive-head shaft, and rotor 80 is affixed to the lowermost rod. The rotor is positioned such that its lowermost tip is adjacent to the intersection of stator 70 and mud/gas anchor 72. Rotation of the pony and sucker rods by the drive-head causes the rotor to displace fluid in the stator and force it up the tubing. At the surface, a three-phase flow of oil, water and gas occurs and passes from the wellhead to a treating and storage facility through the flowline on which pipe section 36 is disposed.

Figure 2:
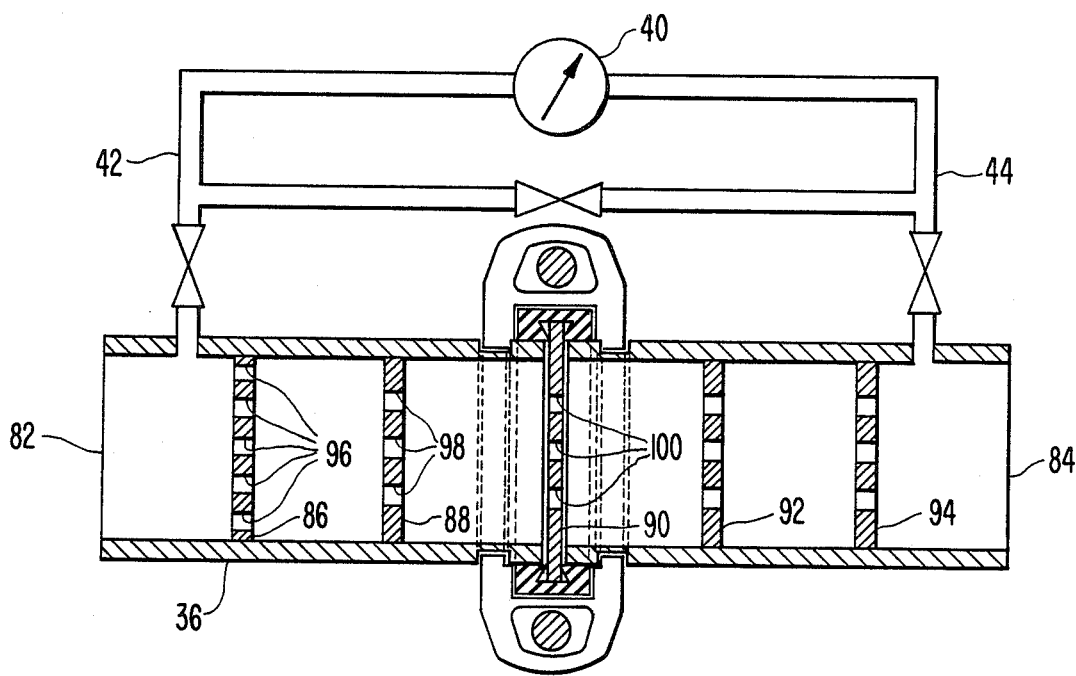
FIG. 2 is a front view of the pipe section of the present invention, shown in section.

Pipe section 36 is illustrated in greater detail in FIG. 2. The section has an inlet 82 and an outlet 84, and in the depicted embodiment, measures two inches in interior diameter. The section is provided with multiple-port diffuser and strainer plate 86 and a plurality of multiple-port differential pressure plates 88, 90, 92 and 94. Differential pressure switch 40 communicates with the fluid stream carried through pipe section 36 by means of fluid lines 42, 44, as has been described above.

The number of plates and number and size of ports or orifices within each plate varies in accordance with the particular application and the flow rate. In the depicted embodiment, five plates, including the diffuser and strainer plate, are provided, but as few as two plates are sufficient in certain applications. Four to six plates, including the diffuser and strainer, are normally sufficient. Generally, a greater number of plates is required when the flow rate of the fluid is low, since it is easier to generate a differential pressure when the flow rate is high. Regardless, it is important that at least two plates be employed. This is because a three-phase flow of oil, water and gas is usually present at the wellhead, and the development of a differential pressure in stages reduces the pressure drop across a single plate and is thus less likely to create emulsions.

Figure 2A:
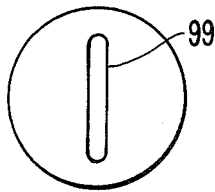
FIG. 2a is a front view of an orifice plate in an alternative embodiment of the present invention.

The number and size of orifices in each plate is selected to generate a sufficient pressure drop for the particular liquid and flow rate that is being encountered. Three to four holes for each plate, other than the diffuser and strainer plate, are generally suitable. If only one orifice is used, it is preferable that it be in the form of a substantially vertically disposed slot 99 as depicted in FIG. 2a, and if the orifices of a plate are substantially circular, it is preferable that the plate be provided with at least two orifices and that two or more of the orifices be disposed at different heights relative to one another. This is because the flow rate of liquid, which is relatively constant when the pump is fed sufficient liquid from the reservoir, typically fluctuates when small variations in the ratio of oil and water to gas are encountered. These fluctuations create problems for most flow-no-flow devices, since the fluctuations exert the same forces and have the same effect on the flapper or plunger of such devices as do fluctuations in the liquid flow rate. By providing a slot-shaped orifice and/or orifices disposed at different heights relative to one another, the presence of free gas at the wellhead will pass through the upper portions of the slots or the upper orifices of the differential pressure plates without causing a significant pressure fluctuation.

A further important advantage of the provision in the present invention for a plurality of plates and a plurality of orifices or a slot-shaped orifice in each plate is the ability of the device to provide a particular range of differential pressures across the pipe section that correspond to a wider range of flow rates. This facilitates a discrimination between sufficient and insufficient flow rates, as will be discussed in greater detail in connection with FIG. 6.

The size of the orifices is generally selected to be as large as possible, without sacrificing the necessary pressure drop, in order to help prevent plugging. In the depicted embodiment, diffuser and strainer plate 86 is provided with 19 holes 96. For an oil flow rate of one to seven gallons per minute, the hole size is 9/64 inches, and for an oil flow rate of seven to fifteen gallons per minute, the hole size is 11/64 inches. The holes are spread out in a series of concentric circles. As a diffuser, plate 86 serves to equalize the flow across the crosssectional area, and as a strainer, the plugging of succeeding plates is reduced because the openings in the first plate are smaller and more numerous than in the succeeding plates. Plate 86 also contributes to the pressure drop through pipe 36 when it is free from plugging, and in the event of plugging, the pressure drop registered by the gauge of the differential pressure switch will increase and provide a visual indication of plugging.

In the depicted embodiment, plates 88, 92 and 94 are each provided with three holes having diameters of 5/32 inches. Plate 90 is provided with three holes 100 each having a diameter of ¼ inch. In the depicted embodiment, the holes of plates 88, 90, 92 and 94 are disposed in a triangular arrangement that is centered on each plate.

A particular advantage of the present invention is the interchangeability of plate 90 with substitute plates. The operating differential pressure range may be increased or decreased by replacing this plate with a plate having a different number and/or size of ports. In the depicted embodiment, plate 90 may be substituted with any one of a number of plates having three or four ports of 3/16- to ¼-inch diameter. The particular manner by which a plate is substituted is described in more detail in connection with FIG. 4.

Figure 3:
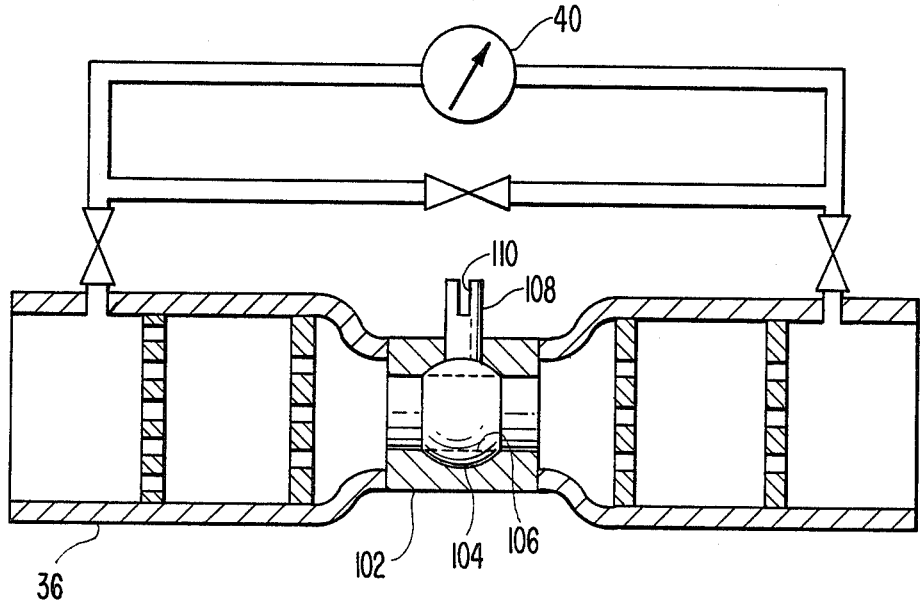
FIG. 3 is a front view of an alternative embodiment of the pipe section of the present invention, shown in section.

An alternative embodiment for varying the operating differential pressure range is illustrated in FIG. 3. There, substitutable plate 90 is replaced with and takes the form of ball-type choke valve 102. Ball 104 is provided with a single port 106 that allows flow through pipe section 36. Protruding handle 108 is affixed to the ball and is provided with slot 110 for insertion of a screw driver to turn the ball. By turning the ball, the effective size of orifice 106 is reduced or enlarged, and the pressure drop caused by choke valve 102 is correspondingly increased or decreased. In the depicted embodiment, port 106 has a ⅜-inch diameter and is used for a relatively low oil flow rate of approximately one to seven gallons per minute.

Figure 4:
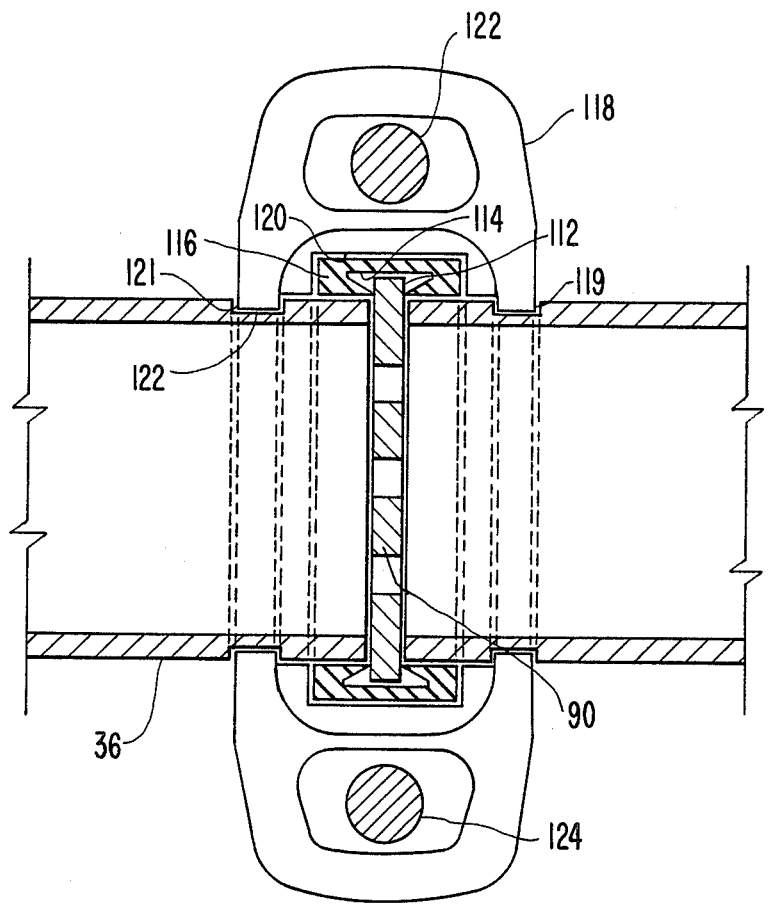
FIG. 4 is a front view of an orifice plate securing means of the present invention, shown in section.

The manner by which substitutable plate 90 is held within the gap in pipe section 36 is especially advantageous, as it allows quick release and substitution and yet is of simple construction. As depicted in FIG. 4, the plate is of such a diameter as to extend somewhat beyond the outer periphery of the pipe section. The protruding portion 112 is received within annular groove 114 of annular coupling gasket 116. The coupling gasket is composed of a suitable sealing material, such as rubber. About the gasket is disposed an annular grooved pipe coupling 118 of standard construction, such that the gasket is received within annular recess 120 of the coupling. Coupling 118 is provided with annular legs 121 which are received within annular grooves 122. The coupling is separated into two semicircular halves, and these halves are bolted together with bolts 122, 124. In order to remove and substitute plate 90, bolts 122, 124 are simply removed from the coupling, the pipe coupling is removed from pipe section 36, gasket 116 is slipped over the edge of plate 90 and slid along pipe section 36 away from the plate, and plate 90 is slid out from between the edges of pipe section 36. The process is reversed for the plate that is to be substituted.

Figure 5A:
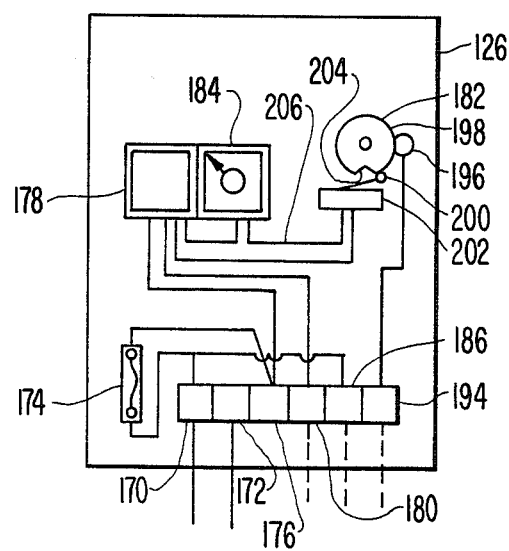
FIG. 5a is a schematic diagram of an alternative embodiment of the circuitry illustrated in FIG. 5.
Figure 5:
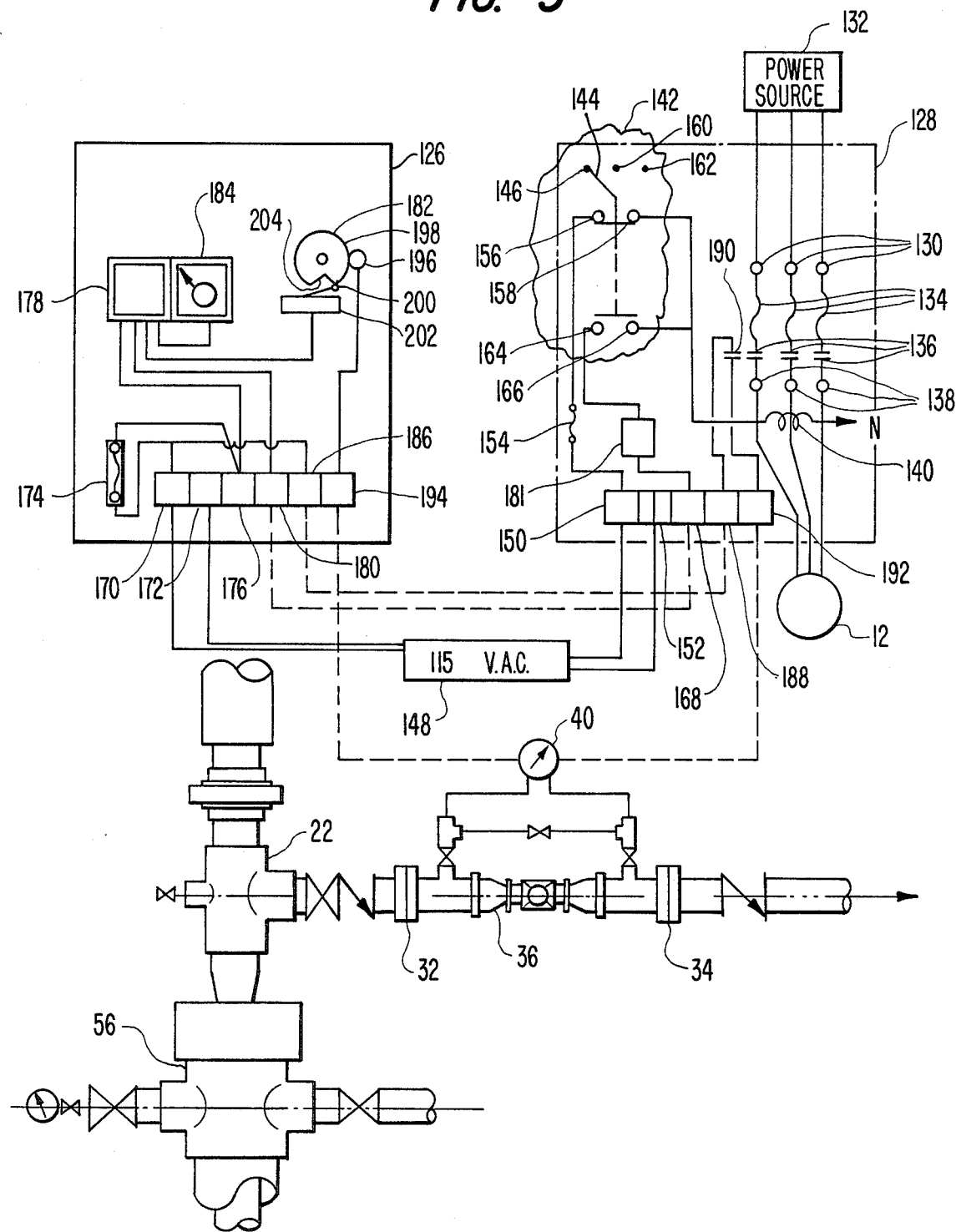
FIG. 5 is a schematic diagram of the circuitry of the invention.

The circuitry associated with differential pressure switch 40 comprises low-flow control panel 126 and motor starter panel 128, as illustrated in FIG. 5. The motor starter panel is of conventional design and provides for either an automatic or manual supply of power to motor 12 through a three-phase electrical system. The electrical system comprises terminals 130 for receiving power from power source 132, fuses 134, contactors 136 and terminals 138. Power is supplied by the system when a voltage across coil 140 to neutral or ground (N) causes the coil to act as a magnet to pull contactors 136 together.

The voltage necessary to activate coil 140 is supplied through switch 142. When switch 144 is in manual position 146, a voltage, which may suitably be 115 volts alternating current is supplied from source 148, which is connected at hot terminal 150 and neutral terminal 152. From terminal 150, current flows across fuse 154, across terminals 156, 158, and to the coil. Thus, when switch lever 144 is in the manual position, motor 12 continuously runs.

When lever 144 is in off position 160, no power is allowed to flow to coil 140, and motor 12 is deactivated.

When lever 144 is switched to automatic position 162, terminals 164, 166 are bridged, and any voltage for activating coil 140 and in turn motor 12 must be from low-flow control panel 126 through terminal 168 of the motor starter panel. At control panel 126, the voltage is supplied during motor 12 operation by source 148 which is connected to hot terminal 170, neutral terminal 172 and, through fuse 174, to fused hot terminal 176. From the fused hot terminal, voltage flows to relay 178, back to terminal 180 and across to terminal 168 on the motor starter panel. In the depicted embodiment, the relay is a 120 volt alternating current relay manufactured by Izumi Denki Corporation of Japan as Model No. RR2PU. From terminal 168, the voltage flows through time clock 181 to the coil. The time clock is an optional feature that allows the automatic operation of the entire apparatus to be shut down for certain hours of the day or at certain fixed intervals.

During conditions of sufficient fluid flow, voltage continuously flows through relay 178. During conditions of insufficient flow, timers 182 and 184 act on relay 178 to control the flow of voltage and in turn shut down motor 12. Timer 182 serves to activate the relay, while timer 184 serves to activate it.

Timer 182 is activated by a voltage originating from source 148. The voltage is supplied through hot terminal 170 to terminal 186 and passes to terminal 188 of the motor starter panel. From terminal 188, the voltage passes to auxiliary switch 190. When coil 140 is activated, auxiliary switch 190 is closed, and the voltage flows through to terminal 192. From terminal 192, the voltage passes to differential pressure switch 40. in the depicted embodiment, the differential pressure switch is a 0 to 15 pounds per square inch switch manufactured by Murphy Manufacturer, Inc. of Tulsa, Okla. as Model No. A-25 DPLOK.

When sufficient fluid is being supplied to the pump, the differential pressure gauge of the differential pressure switch registers a sufficiently high differential pressure. In this condition, the differential pressure switch is in an open position so that voltage does not flow from terminal 192 of the motor starter panel to terminal 194 of the control panel. When the fluid flow rate drops to a level at which the pump may be damaged, the differential pressure gauge of the differential pressure switch registers a differential pressure that is at or below a set point indicative of such a low flow. The set point is selected in accordance with procedures known to those ordinarily skilled in the art and may be determined in accordance with a pump manufacturer's specification for a minimum fluid flow. When the differential pressure is at or below the set point, the differential pressure switch is switched to a closed position so that voltage flows from terminal 192 to terminal 194. In a surging condition, when the differential pressure is varying above and below the set point, the differential pressure switch correspondingly opens and closes so that voltage only flows when the differential pressure is at or below the set point.

Voltage that flows to terminal 194 is passed to motor 196 of timer 182, which drives rotating cam 198 a distance proportional to the amount of time that differential pressure switch 40 allows a voltage flow. In the depicted embodiment, timer 182 is manufactured by H & R Company of Philadelphia, Penn. as Model No. HR-25. When the cam has made a complete revolution, wheel 200 of switch 202 falls into slot 204 to activate the switch, which in turn deactivates relay 178. Timer 182 is at the same time designed to receive sufficient power following the complete revolution to allow wheel 200 to continue to a point just beyond slot 204, in preparation for a subsequent revolution. The deactivation of relay 178 in turn terminates the voltage flow through the relay to terminal 180, and this causes the deactivation of coil 140 and motor 12.

Timer 184 is activated by relay 178 when the relay is deactivated by timer 182. In an alternative embodiment, partially illustrated in FIG. 5a, timer 184 is activated directly by timer 182 via conductive path 206. In the depicted embodiment, timer 184 is an electromechanical timer driven by a motor, and it is adjustable to time periods from zero to sixty minutes. It is manufactured by Izumi Denki Corporation of Japan as Model No. RTM-P2N. It is set for a prescribed time, selected to allow the flow rate from the reservoir to increase, and when it measures that prescribed time, it activates relay 178 which in turn provides voltage to terminal 180. This in turn causes the activation of coil 140 and the starting of motor 12. If desired, in an alternative embodiment, a starter switch can be provided for manually bypassing timer 184 to thus provide voltage to terminal 180 immediately. If an unsatisfactory low-flow condition persists when timer 184 restarts the motor, differential pressure switch 40 will be closed and cam 198 will revolve quickly to rapidly shut down the motor once again.

By this arrangement, the timing system of the present invention provides an important advantage over timing systems that might otherwise be used in a pump-off control apparatus. Most timing systems are reset each time an activating signal is removed. Such timers are inadequate when fluid is surging, because they would be continually reset, without causing a motor shut-down, despite the fact that the accumulation of a large number of short periods of low flow may damage the pump. In the present invention, the short periods are accumulated so that the pump is protected from their cumulative effect.

The specific wiring of the circuitry illustrated in FIG. 5 will be readily achievable by those of ordinary skill in the art. Further, those of ordinary skill will readily appreciate that numerous modifications are within the scope of the invention, such as the substitution of the cam timer 182 with an electronic timer, the combination of the terminal strips of control panel 126 and motor starter panel 128 into a single strip, and the like. An electronic timer suitable for replacing cam timer 182 is one manufactured by Time Mark, Inc. of Tulsa, Olkahoma as a combination of a delay-off timer, Model No. 361-12V-1SEC, and delay-on timer, Model No. 330-12-V-60S.

Figure 6:
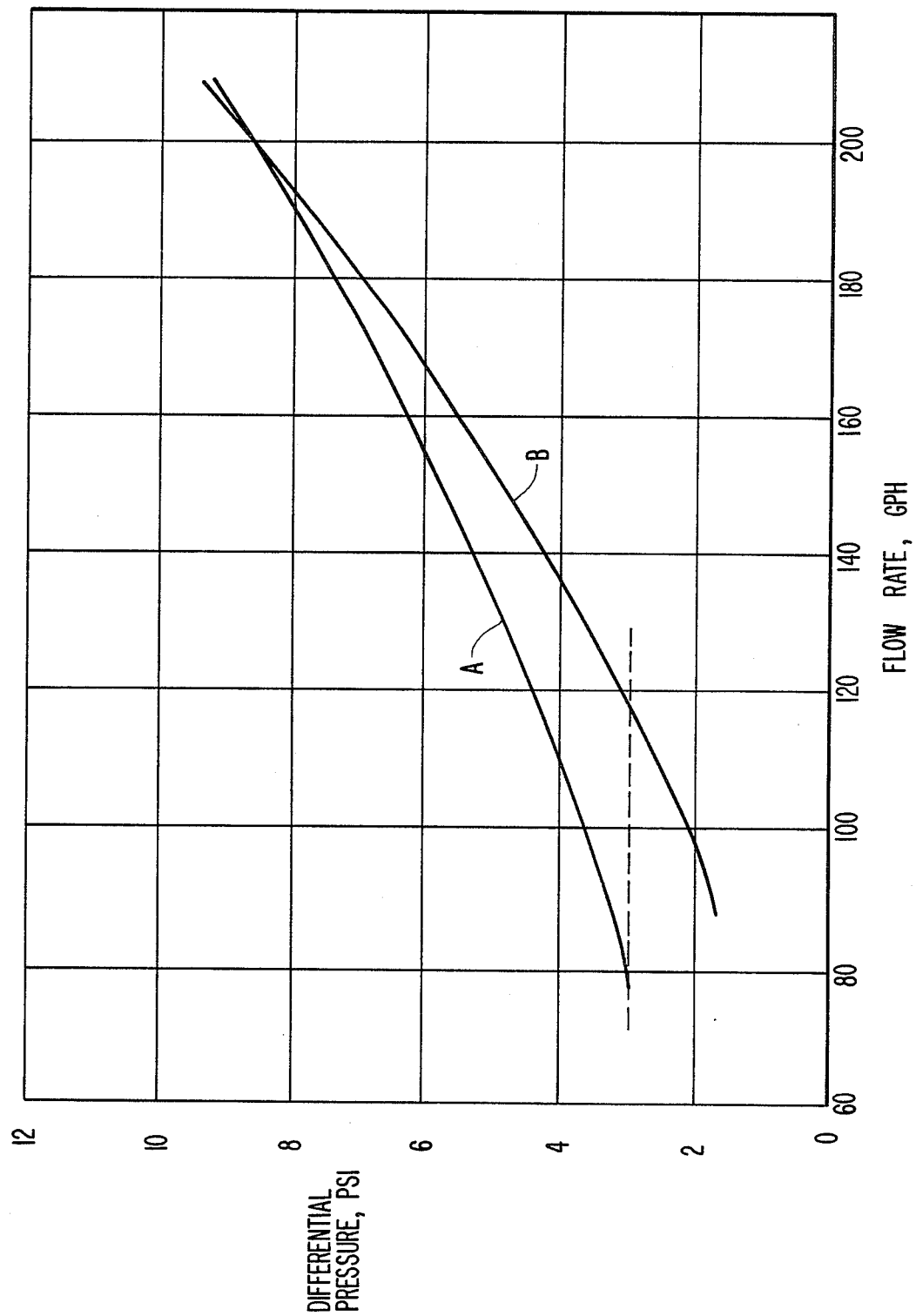
FIG. 6 is a chart illustrating the relationship between differential pressure and flow rate for a device within the scope of the present invention.

An important advantage of the multiple port, multiple plate design of the present invention is that it allows a higher differential pressure to be used as the set point to indicate a particular level of low flow. This advantage is best illustrated in FIG. 6, wherein differential pressure in pounds per square inch is charted as a function of flow rate in gallons per hour. Curve A records measurements made by the apparatus of the present invention having one differential pressure plate with three ¼-inch orifices and three differential pressure plates with three 11/64-inch orifices. Curve B records measurements made with an apparatus that is similar except that it has only one differential pressure plate with one ¼-inch orifice.

At a flow rate of about 80 gallons per hour, the differential pressure recorded in curve A measures about three pounds per square inch, while the differential pressure recorded in extrapolated curve B would be only between one and two pounds per square inch. At this flow rate, it would not be difficult in the multiple port, multiple plate design to select a differential pressure between zero and three pounds per square inch as a set point for the differential pressure switch. However, when one plate and one orifice are used, as reflected in curve B, the differential pressure set point must be selected from zero to between one and two pounds per square inch. This creates a problem since the set point is necessarily relatively close to the differential pressure value that is registered during the normal flow rate. Any small fluctuation in the differential pressure, as might be caused, for example, by a small variation in the ratio of oil and water to gas, bridges the gap between the differential pressure for the normal rate of flow and the set point, and thus risks restricting the overall rate of flow due to frequent activations of timer 182.

Having thus described the present invention in detail, it will be apparent to those skilled in the art that modifications and additions can be made which are within the spirit and scope of the invention.

I claim:

1. A low-flow pump-off control device for deactivating a motor for a pump during conditions when a rate of supply of a source of fluid to be pumped by said pump is insufficient, said device comprising:

a pipe section having an inlet and an outlet, said inlet being connectable to said source of fluid to be pumped through said pipe section;

a plurality of plates disposed in said pipe section, each of said plates respectively defining at least one orifice through which said fluid is caused to pass;

a differential pressure switch for sensing a differential pressure between a pressure upstream of a first one of said plates and a pressure downstream of a last one of said plates that is at or below a set point indicative of a predetermined low flow rate of said liquid;

a first timer in communication with said switch for accumulating periods of time at which said switch senses said differential pressure;

a motor activation and deactivation means in communication with said timer for deactivating said motor when said accumulated periods of time total a predetermined amount; and a second timer in communication with said first timer which is activated when said accumulated periods of time total said predetermined amount, wherein said motor activation and deactivation means is in communication with said second timer and activates said motor when said second timer times a second predetermined amount of time.

2. A low-flow pump-off control device of claim 1 wherein said first timer comprises a rotating cam that rotates when said first timer is provided with a voltage, wherein said accumulated periods of time total said predetermined amount when said cam revolves sufficiently to activate a switch in said first timer, and wherein said voltage is supplied to said first timer from said differential pressure switch when said switch senses said differential pressure.

3. The low-flow pump-off control device of claim 1 wherein said motor activation and deactivation means is a relay.

4. The low-flow pump-off control device of claim 1 wherein said plurality of plates are disposed substantially perpendicularly in said pipe section.

5. The low-flow pump-off control device of claim 1 wherein said first plate is a diffuser and strainer plate defining orifices that are smaller and more numerous than orifices defined respectively by the other of said plates.

6. The low-flow pump-off control device of claim 1 wherein at least one of said plates defines at least two orifices that are at different heights relative to each other.

7. The low-flow pump-off control device of claim 1 wherein at least one of said plates defines at least one orifice that is in the form of a slot.

8. The low-flow pump-off control device of claim 1 wherein at least one of said plates is in the form of a choke valve which defines an orifice and comprises a means for varying the size of said orifice.

9. The low-flow pump-off control device of claim 1, wherein said pipe section is separated to form an annular gap and one of said plates is received within said gap, and wherein said device further comprises an annular coupling gasket that seals said gap, an annular grooved pipe coupling having a recess into which is received said gasket, said pipe coupling being separated into two semicircular halves, and two bolts for securing together said semicircular halves about said gasket and said gap.

10. The low-flow pump-off control of claim 9 wherein said plate that is received in said gap is of such a diameter as to have an annular protruding portion that extends beyond an outer periphery of said pipe section, and wherein said gasket defines an annular groove into which said protruding portion is received.

11. A method for deactivating a motor for a pump during conditions when a rate of supply of a source of fluid to be pumped by said pump is insufficient, the method comprising the steps of:

providing a low-flow pump-off control device comprising a pipe section having an inlet and an outlet, said inlet being connectable to said source of fluid to be pumped through said pipe section, a plurality of plates disposed in said pipe section, each of said plates respectively defining at least one orifice through which said fluid is caused to pass, and a differential pressure switch in communication with said pipe section upstream of a first one of said plates and downstream of a last one of said plates;

selecting a differential pressure between a pressure upstream of said first one of said plates and a pressure downstream of said last one of said plates that corresponds to the upper limit of an insufficient flow rate to said pump;

supplying said differential pressure switch with a set point equal to said differential pressure;

accumulating periods of time at which said switch senses a differential pressure at or below said set point;

deactivating said motor when said accumulated periods of time total a first predetermined amount of time; and reactivating said motor when a second predetermined amount of time elapses following the time at which said motor is deactivated.

* * * * *